United States Patent [19]

Smart

[11] 4,163,613
[45] Aug. 7, 1979

[54] CAMERA FOCUS OR EXPOSURE ADJUSTMENT MECHANISM

[75] Inventor: David C. Smart, Penfield, N.Y.

[73] Assignee: Eastman Kodak Company, Rochester, N.Y.

[21] Appl. No.: 872,858

[22] Filed: Jan. 27, 1978

[51] Int. Cl.² .......................... G03B 3/00; G03B 7/04
[52] U.S. Cl. .................................. 354/198; 354/273; 354/288
[58] Field of Search ............................... 354/195–201, 354/191, 190, 193, 47, 270–274, 288; 350/255; 74/31

[56] References Cited

U.S. PATENT DOCUMENTS

| | | | |
|---|---|---|---|
| 800,081 | 9/1905 | Davis | 354/197 |
| 906,222 | 12/1908 | Hall | 354/201 |
| 1,239,469 | 9/1917 | Dietz | 354/195 |
| 2,949,836 | 8/1960 | Bäab | 354/198 |
| 3,092,001 | 6/1963 | Schlapp | 354/198 |
| 3,709,132 | 1/1973 | Farrell et al. | 354/195 |
| 3,846,812 | 11/1974 | Biber | 354/145 |
| 3,890,626 | 6/1975 | Ettischer | 354/197 |
| 3,903,537 | 9/1975 | Ettischer | 354/197 |

Primary Examiner—L. T. Hix
Assistant Examiner—Shelley Wade
Attorney, Agent, or Firm—R. A. Fields

[57] ABSTRACT

A camera body houses a rotatable pinion disposed in engagement with a fixed rack for translation along the rack as the pinion is rotated. A manipulatable portion of the pinion exteriorly projects through a slot in the camera body, enabling the pinion to be manually rotated. A slide member rotatably supports the pinion and is supported within the camera body for translation by the rotated pinion in adjacent overlapping relation to the slot. In this way, the slide member maintains the slot substantially closed to dirt or other foreign matter during the various stages of rotation of the pinion. A control element, adjustably movable for focusing or exposure control, is operatively coupled to the slide member for movement by the slide member in response to manual rotation of the pinion. A visual indicator on the slide member is viewable through a window in the camera body for indicating the proper setting of the control element.

7 Claims, 4 Drawing Figures

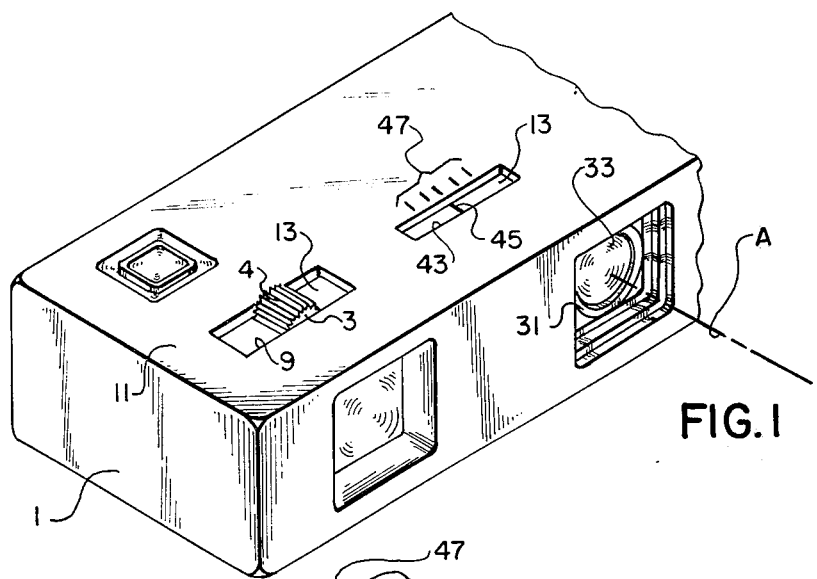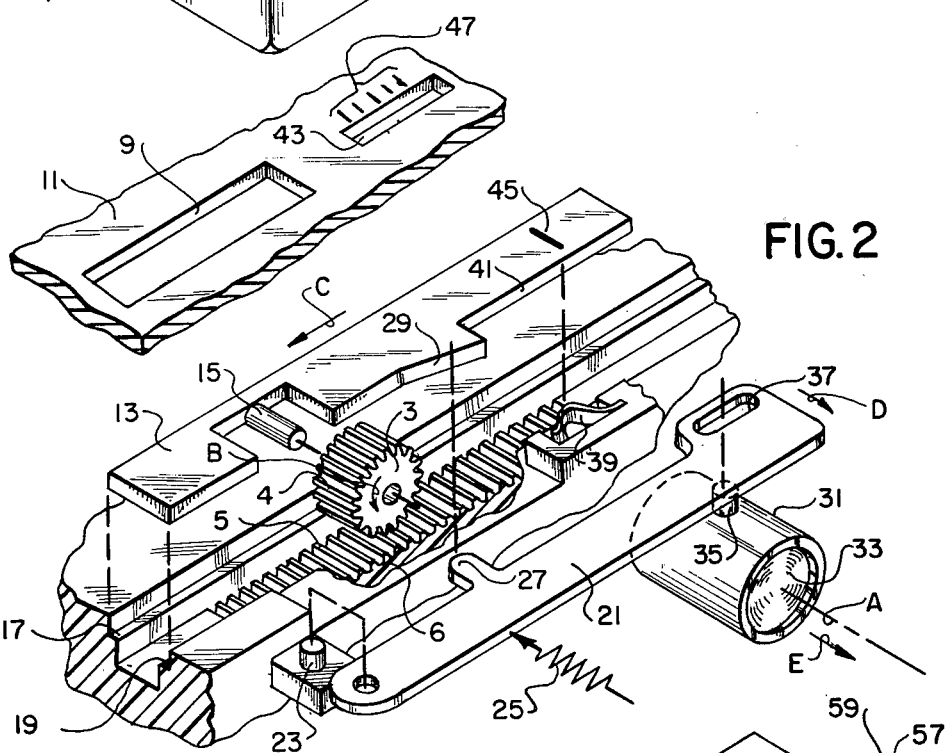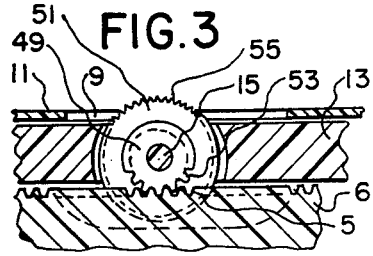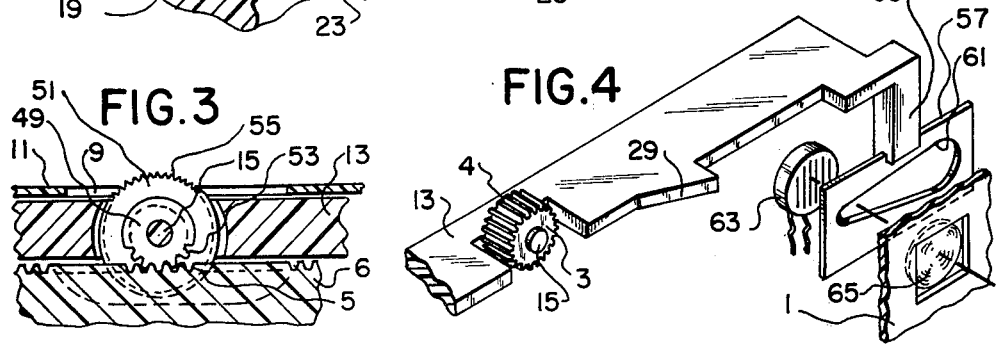

CAMERA FOCUS OR EXPOSURE ADJUSTMENT MECHANISM

BACKGROUND OF THE INVENTION

1. Field of the Invention

The present invention relates to photography in general, and more particularly to a mechanism for adjusting a camera function such as focus or exposure.

2. Description of the Prior Art

It is known in early cameras of the type having a folding bellows, which connects the camera body and a variable focus objective lens, to provide a rack and pinion mechanism for moving the camera lens back and forth along its optical axis for focus adjustment. Examples of such cameras are disclosed in U.S. Pat. No. 800,081, granted Sept. 19, 1905 in the name of Davis and U.S. Pat. No. 3,092,001, granted June 4, 1963 in the name of Schlapp. Generally, these cameras include a manually rotatably thumb wheel which is connected by means of a rotation shaft to the pinion for moving the pinion along the rack to adjust the focus of the objective lens. While these early cameras were satisfactory for their time, the rack and pinion as well as the thumb wheel are typically located outside of the main camera housing and therefore are not sealed against contamination by dirt or other foreign matter.

Later generation cameras, in particular the pocket-type cameras for size 110 film, are provided with a manually operable focus or exposure slider whose upper half or manipulatable portion projects through a slot in the camera body. The manipulatable portion of the slider may include an indicator pointer which is aligned with focusing or exposure scale indicia, such as distance setting numbers or ambient light indicating symbols, located on an exterior face of the camera body. When, for example, focusing adjustment is desired, the manipulatable portion of the slider is manually pushed along the camera slot causing the camera lens to be moved along its optical axis. While the slider provides a convenient adjustment means for focusing or exposure control, it is possible for an operator to appreciably increase the frictional force which oppose movement of the slider by pressing down sufficient hard on the slider to cause the slider to rub against is supporting or guide surface. Such frictional forces will, of course, prevent a smooth or easy action of the slider, possibly resulting in imprecise focus or exposure settings and wear of parts.

SUMMARY OF THE INVENTION

The previously described and other problems associated with prior art camera focus or exposure adjustment mechanisms are believed solved in accordance with the present invention. Specifically, with the present invention the camera interior is substantially sealed against any contamination by dirt or other foreign matter in the vicinity of the focus or exposure adjustment mechanism, and the camera operator when pressing down on a manually operable adjusting member of such mechanism will not produce any appreciable frictional force that might oppose manual movement of the adjusting member.

In keeping with these desirable features, a preferred embodiment of the present invention resides in a photographic camera of the type including a control element adjustably movable for focusing or exposure control; a rotatable pinion disposed in engagement with a fixed rack for translation along the rack as the pinion is rotated; and coupling means connecting the control element and the pinion to adjustably move the control element for focus or exposure control in response to translation of the pinion along the rack. According to the preferred embodiment, the camera body houses both the rack and the pinion and includes an exterior wall having a slot through which only a manipulatable portion of the pinion extends from the camera body. This arrangement enables the pinion to be manually rotated for translation along the rack to adjustably move the control element. At the same time, should the camera operator press down on the pinion as it is being rotated, the resulting reaction force will not produce any appreciable frictional force that would impede translation of the pinion along the rack to adjustably move the control element.

Pursuant to another feature of the preferred embodiment, the coupling means for the control element and the pinion includes a slide member which rotatably supports the pinion at its axis of rotation and which is drivingly coupled to the control element. Owing to this arrangement, a given distance of linear motion of an operator's finger is rotating the pinion is required to translate the slide member one-half that distance. This, it will be appreciated, enables a very precise setting of the control element for focusing or exposure. The slide member is mounted within the camera body for movement by the rotated pinion in adjacent overlapping relation to the camera slot. As a result, the slide member maintains the camera slot substantially closed to dirt or other foreign matter during the various stages of rotation of the pinion.

BRIEF DESCRIPTION OF THE DRAWINGS

For a more complete understanding of the present invention, as well as further advantages and features thereof, reference should be had to the following detailed description of the invention taken in conjunction with the accompanying drawings, in which:

FIG. 1 is a fragmentary perspective view of a still picture camera which embodies a focus adjustment mechanism in accordance with the present invention;

FIG. 2 is an exploded perspective view of an interior portion of the camera depicted in FIG. 1, showing the focus adjustment mechanism in detail;

FIG. 3 is an elevational view in section of a modification of the focus adjustment mechanism; and FIG. 4 is a fragmentary perspective view of an exposure adjustment mechanism in accordance with the present invention.

DESCRIPTION OF THE PREFERRED EMBODIMENTS

Because cameras are well known, this description will be directed in particular to elements forming part of or cooperating directly with apparatus in accordance with the present invention. It is to be understood that camera elements not specifically shown or described may take various forms known to those skilled in the camera art.

Referring now to the drawings and in particular to FIGS. 1 and 2, there is shown a camera body 1 which houses a wheel member in the form of a rotatable pinion 3. The pinon 3 has a toothed peripheral edge 4 arranged in operative engagement with a toothed side 5 of a rack 6. The rack 6 is fixed in place and may be integrally formed with the camera body 1. As a result, the pinion 3 is translated along the rack 6 as the pinion is rotated.

As shown in FIG. 1, the toothed peripheral edge 4 of the rotatable pinion 3 protrudes through a slot 9 in a top wall 11 of the camera body 1. This enables the pinion 3 to be manually rotated by a camera operator. The slot 9 extends substantially parallel to the rack 6 and, as viewed in FIG. 2, is of sufficient length to permit translation of the pinion along the rack as the pinion is manually rotated.

A slide 13 is provided with a shaft pin 15 which rotatably supports the pinion 3 at its axis of rotation. The slide 13 is supported on two parallel, spaced rails 17 and 19 within the camera body 1 for translation by the rotated pinion 3 in adjacent overlapping relation to the slot 9 in the top wall 11. As depicted in FIGS. 1 and 2, the slide 13 is wider than the slot 9 and contacts the undersurface of the top wall 11. Owing to this arrangement, the slide 13 maintains the slot 9 substantially closed to dirt or other foreign matter during the various stages of rotation of the pinion 3.

As shown in FIG. 2, a lever 21 is urged by a spring member 25 to pivot in a counterclockwise direction about a mounting pin 23 in the camera body 1. This spring urging causes a finger-like extension 27 of the lever 31 to lightly bear against a ramp edge 29 of the slide 13. A lens barrel 31, in which is housed a variable focus objective lens 33, is provided with a follower pin 35. The follower pin 35 extends into a drive slot 37 in the lever 21. To focus the objective lens 33 by moving it along the optical axis A, the pinion 3 may be manually rotated about the shaft pin 15 in a counterclockwise direction (arrow B). This translates the slide 13 to the left (arrow C). Thereupon, the ramp edge 29 of the slide 13 pivots the lever 21 in a clockwise direction (arrow D) about the mounting pin 23, driving the lens barrel 31 outwardly (arrow E) along the optical axis A of the objective lens 33. Manual rotation of the pinion 3 about the shaft pin 15 in a clockwise direction, of course, permits the spring member 25 to drive the lens barrel 31 inwardly along the optical axis A of the objective lens 33, i.e., in a direction opposite to that indicated by arrow E. A guide channel, not shown, but which may be integrally formed with the camera body 1, is connected to the lens barrel 31 to support it for movement in either direction along the optical axis A as the pinion 3 is manually rotated. Friction including means in the form of a drag spring 39, which presses against a straight edge 41 of the slide 13, maintains the focus adjustment of the lens barrel 31 by substantially preventing movement of the slide other than by manual rotation of the pinion 3.

It will be appreciated that should the camera operator press down on the pinion 3 as it is being manually rotated to adjust the focus of the objective lens 33, the resulting reaction force will not produce any appreciable frictional force that would impede translation of the pinion along the rack 6. This enables a very smooth, easy and quick focus adjustment, and is in marked contrast to prior art devices in which it was possible for an operator to increase the frictional forces which oppose manual movement of a focus slider by pressing down sufficiently hard on the focus slider to cause it to rub against a supporting surface. Such frictional forces, of course, prevent the smooth or easy adjustment of the objective lens and may, therefore, result in imprecise focusing and wear of parts.

Owing to the arrangement of the rotatable pinion 3 and the fixed rack 6 in the preferred embodiment, a given distance of linear motion of an operator's finger in rotating the pinion is required to translate the slide 13 one-half that distance. This, it will be recognized, enables a very precise setting of the objective lens 33.

Referring again to FIGS. 1 and 2, there is shown a window 43 in the top wall 11 of the camera body 1. A visual indicium 45 on the slide 13 moves to different locations within the window 43 as the slide is translated in response to manual rotation of the pinion 3. The indicium 45 may be aligned with distance scale and/or focusing symbols 47 on the top wall 11 of the camera body 1.

A modification of the pinion 3 is shown in FIG. 3. FIG. 3 depicts a compound pinion consisting of first and second pinion members 49 and 51, which are coaxially mounted on the shaft pin 15 of the slide 13 for simultaneous rotation. The first pinion member 49 has a toothed peripheral edge 53 in operative engagement with the toothed side 5 of the rack 6. The second pinion member 51, which is larger in diameter than the first pinion member 49, has a knurled edge 55 protruding through the slot 9 in the top wall 11 of the camera body 1. The knurled edge 55 facilitates manual rotation of the first and second pinion members 49 and 51. The use of a compound pinion, as depicted in FIG. 3, permits the achievement of a mechanical advantage greater than that achieved by the simple pinion 3, shown in FIG. 2 and permits use of finger-drive surface, i.e., the knurled edge 55, rather than a toothed surface.

Referring now to FIG. 4, there is shown a modification of the adjustment mechanism, depicted in FIG. 2, for accomplishing exposure adjustment instead of focus adjustment. A diaphragm blade 57 is connected to the slide 13 by an intermediate arm 59. As is well known to those familiar with exposure control mechanisms, the diaphragm blade 57 may include a substantially teardrop-shaped aperture 61 which is aligned with a photocell 63, located within the camera body 1. The diaphragm blade 57 is disposed behind a light gathering lens 65 which directs ambient light to the photocell 63. When the pinion 3 is manually rotated to translate the slide 13, the diaphragm blade 57 moves with the slide to vary the amount of ambient light reaching the photocell 63.

The invention has been described in detail with particular reference to preferred embodiments thereof, but it will be understood that variations and modifications can be effected within the spirit and scope of the invention.

I claim:

1. In a photographic camera of the type including a control element movable for adjusting a function in the camera; a rotatable wheel member adapted to cooperate with a fixed longitudinal member for causing said wheel member to translate along said fixed member as said wheel member is rotated in contact with said fixed member; and means coupling said control element and said wheel member for adjustably moving said control element in response to translation of said wheel member along said fixed member, the improvement comprising:

a camera body housing said wheel member and said fixed member, said camera body including exterior wall means defining a slot through which only a portion of said wheel member extends from said camera body for enabling said wheel member to be manually rotated for translation along said fixed member to adjustably move said control element.

2. The improvement as recited in claim 1, wherein said coupling means includes a slide member which rotatably supports said wheel member and which is mounted within said camera body for movement by said wheel member in adjacent overlapping relation to said slot for maintaining said slot substantially closed.

3. In a photographic camera of the type including a control element adjustably movable for focusing or exposure control; a rotatable pinion disposed in engagement with a fixed rack for translation along said rack as said pinion is rotated; and means coupling said control element and said pinion for adjustably moving said control element in response to translation of said pinion along said rack, the improvement comprising:

a camera body housing said pinion and said rack and including exterior wall means defining a slot through which only a portion of said pinion extends from said camera body for enabling said pinion to be manually rotated, said slot extending substantially parallel to said rack and being of sufficient length to permit translation of said pinion within said slot as said pinion is manually rotated in engagement with said rack to adjustably move said control element.

4. The improvement as recited in claim 3, wherein said coupling means includes a slide member which is mounted within said camera body for sliding movement substantially parallel to said rack in adjacent overlapping relation to said slot, and wherein said pinion is rotatably supported on said slide member for moving said slide member.

5. The improvement as recited in claim 4, wherein said camera body encloses friction inducing means disposed in contact with said slide member for maintaining the adjustment of said control element.

6. The improvement as recited in claim 4, wherein said camera body includes a window through which only a portion of said slide member is exposed, and wherein said exposed portion of said slide member includes visual indicator means relating to the adjustment of said control element.

7. In a photographic camera of the type including a variable focus objective lens having at least one lens element mounted for movement to focus said objective lens; a rotatable pinion having a toothed peripheral edge disposed in engagement with a toothed side of a fixed rack to enable translation of said pinion along said rack as said pinion is rotated; and means coupling said pinion and said lens element for moving said lens element to focus said objective lens in response to translation of said pinion along said rack, the improvement comprising:

a camera body housing said pinion and said rack and including exterior wall means defining a slot through which a portion of said toothed peripheral edge of said pinion extends from said camera body for enabling said pinion to be manually rotated, said slot extending substantially parallel to said rack and being of sufficient length to permit translation of said pinion within said slot as said pinion is manually rotated in engagement with said rack; and said coupling means including a slide member rotatably supporting said pinion at its axis of rotation and mounted within said camera body for translation by said pinion in adjacent overlapping relation to said slot, and further including cam defining means operatively connecting said slide member and said lens element for moving said lens element to focus said objective lens as said slide member is translated by manually rotating said pinion.

* * * * *